(12) United States Patent
Pugel

(10) Patent No.: US 7,215,679 B2
(45) Date of Patent: May 8, 2007

(54) METHOD, APPARATUS AND DATA STRUCTURE ENABLING MULTIPLE CHANNEL DATA STREAM TRANSMISSION

(75) Inventor: Michael Anthony Pugel, Noblesville, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 981 days.

(21) Appl. No.: 09/942,886

(22) Filed: Aug. 30, 2001

(65) Prior Publication Data

US 2003/0043798 A1 Mar. 6, 2003

(51) Int. Cl.
*H04L 12/28* (2006.01)
*H04L 12/56* (2006.01)

(52) U.S. Cl. ............... 370/412; 370/468; 370/435; 370/535; 370/538; 375/240.24; 348/385.1; 348/388.1

(58) Field of Classification Search ............ 370/468, 370/474, 498, 535, 230, 412, 538; 348/385.1, 348/388.1; 375/240.24; 714/4
See application file for complete search history.

(56) References Cited

U.S. PATENT DOCUMENTS

| | | | |
|---|---|---|---|
| 5,517,250 A | 5/1996 | Hoogenboom et al. | 348/467 |
| 5,574,505 A | 11/1996 | Lyons et al. | 348/426 |
| 5,621,463 A | 4/1997 | Lyons et al. | 348/387 |
| 5,640,395 A * | 6/1997 | Hamalainen et al. | 370/322 |
| 5,729,292 A | 3/1998 | Acampora et al. | 348/390 |
| 5,864,557 A | 1/1999 | Lyons | 370/444 |
| 5,920,572 A | 7/1999 | Washington et al. | 370/535 |
| 6,052,384 A | 4/2000 | Huang | 370/468 |
| 6,118,786 A | 9/2000 | Tiernan et al. | 370/416 |
| 6,138,012 A | 10/2000 | Krutz et al. | 455/427 |
| 6,195,368 B1 | 2/2001 | Gratacap | 370/535 |
| 6,195,403 B1 | 2/2001 | Anderson et al. | 375/376 |
| 6,233,253 B1 | 5/2001 | Settle et al. | 370/474 |
| 6,233,255 B1 | 5/2001 | Kato et al. | 370/486 |
| 6,246,701 B1 * | 6/2001 | Slattery | 370/503 |
| 6,373,905 B1 * | 4/2002 | Yasuda et al. | 375/340 |
| 6,754,271 B1 * | 6/2004 | Gordon et al. | 375/240.12 |
| 2001/0007557 A1 * | 7/2001 | Yamada et al. | 370/389 |
| 2002/0154694 A1 * | 10/2002 | Birch | 375/240.05 |
| 2002/0184642 A1 * | 12/2002 | Lude et al. | 725/105 |
| 2004/0032829 A1 * | 2/2004 | Bonn | 370/230 |
| 2005/0086555 A1 * | 4/2005 | Langridge | 714/4 |

FOREIGN PATENT DOCUMENTS

| | | |
|---|---|---|
| WO | WO 99/37048 | 7/1999 |
| WO | WO 01/47281 A2 | 6/2001 |

OTHER PUBLICATIONS

EPO Search Report dated Nov. 4, 2003 attached.

* cited by examiner

*Primary Examiner*—John Pezzlo
*Assistant Examiner*—Inder Pal Mehra
(74) *Attorney, Agent, or Firm*—Jospeh J. Laks; Ronald H. Kurdyla; Guy H. Eriksen

(57) ABSTRACT

A method, apparatus and data structure enabling multiple channel data stream transmission by inserting data to be transmitted into portions of a plurality of transport streams nominally including NULL packets. The inserted packets have associated with them stream identification and sequence code information enabling the reconstruction of the initial data stream using data packets transmitted via a plurality of data channels.

12 Claims, 4 Drawing Sheets

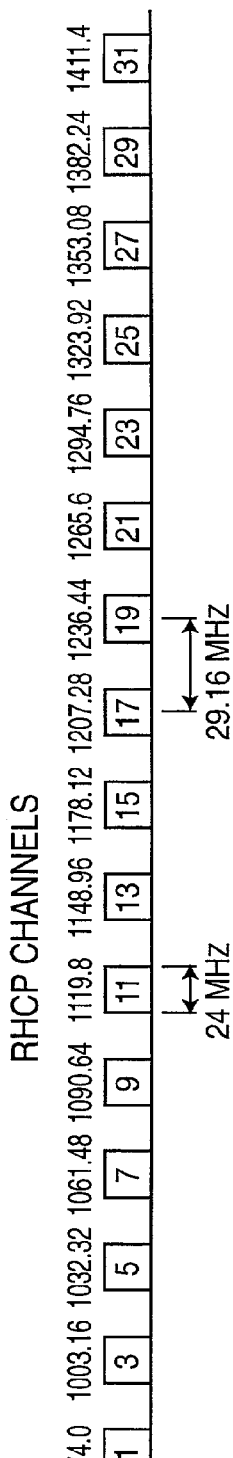
FIG. 2A
FIG. 2B
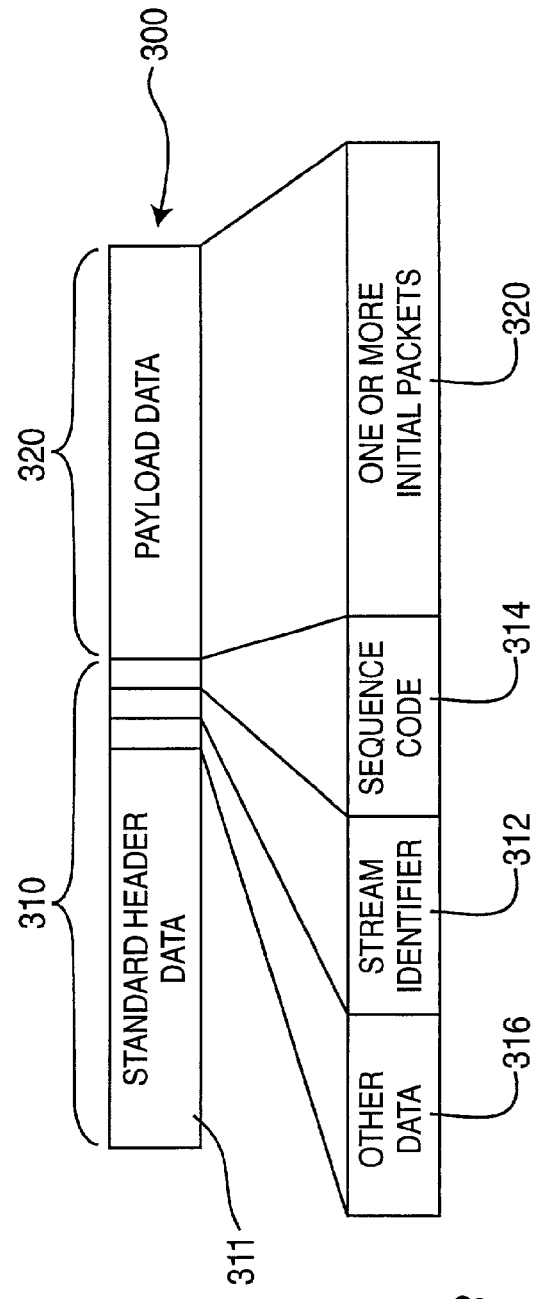
FIG. 3

METHOD, APPARATUS AND DATA STRUCTURE ENABLING MULTIPLE CHANNEL DATA STREAM TRANSMISSION

This application is related to simultaneously filed U.S. Patent application Ser. No. 09/942,810, filed Aug. 30, 2005, entitled METHOD AND APPARATUS FOR SIMULTANEOUSLY RETRIEVING PORTIONS OF A DATA STREAM FROM DIFFERENT CHANNELS which is incorporated herein by reference in its entirety.

The invention relates to communications systems and, more particularly, a mechanism for utilizing transmission channel bandwidth that is normally not usable.

BACKGROUND OF THE INVENTION

Communications systems having higher data throughput and greater efficiency in the use of available bandwidth increasingly are in demand. In, illustratively, a satellite communications system, a satellite provides a plurality of communications channels to terrestrial receivers. Each communications channel has associated with it, for example, a particular transponder, a particular polarization and the like. Normally, each defined channel broadcasts at its maximum data rate.

Where the amount of data to be transmitted is less than the amount of data that a channel is capable of transmitting, the defined channel is underutilized. In this case, the defined channel transmits NULL packets during those time slices within which there is no data available to be transmitted. Where the data to be transmitted requires more bandwidth than is available on the channel, an alternate channel having greater available capacity must be selected. Thus, communications channels typically operate at less than a 100% utilization level due to the likelihood that the number of data streams to be transmitted, and the amount of data within each stream, are likely not to match the bandwidth available in the transmission channels.

SUMMARY OF THE INVENTION

The invention comprises a method, apparatus, and data structure for segmenting a data stream into a plurality of portions where each portion may be transmitted via any one (or more) of a plurality of transmission channels. The data to be transmitted is associated with stream identification and packet sequence information such that the various segments may be recombined at a receiver. The processed packets or packet groups are encapsulated as necessary in a transport packet structure adapted to a multiple channel transmission medium and transmitted thereover to a receiver. Channel identification and channel transmission time information may also be provided to identify which channels will be carrying desired data and when such channels will be carrying the desired data.

A method according to an embodiment of the invention comprises associating each of one or more groups of packets forming a bitstream with a stream identifier and a respective sequence code, the groups of packets comprising at least one bitstream packet; and transmitting, via any one of a plurality of available transmission channels, each of said one or more associated groups of packets, the transmission channels nominally transmitting NULL packets in the event of underutilization, the associated groups of packets being transmitted in place of the nominally transmitted NULL packets.

BRIEF DESCRIPTION OF THE DRAWINGS

The teachings of the present invention can be readily understood by considering the following detailed description in conjunction with the accompanying drawings, in which:

FIG. 2 depicts a graphical representation of a DBS frequency plan, exemplary of a frequency plan which may be used in accordance with the principles of the invention;

FIG. 3 depicts an exemplary data structure used in accordance with the principles of the invention;

To facilitate understanding, identical reference numerals have been used, where possible, to designate identical elements that are common to the figures.

DETAILED DESCRIPTION OF THE PREFERRED EMBODIMENTS

Figure 1:
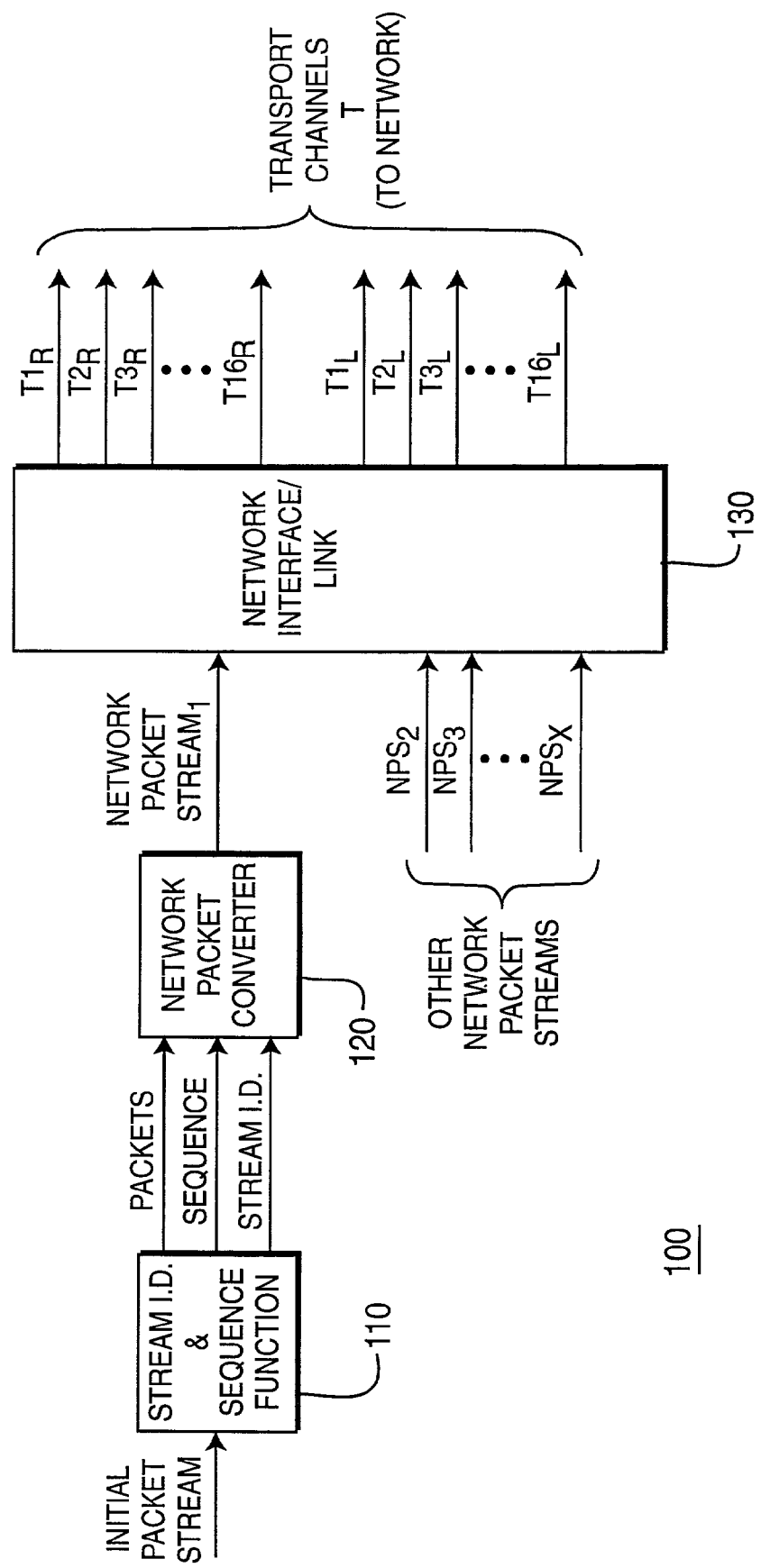
FIG. 1 depicts a high-level block diagram of an exemplary packet stream processing apparatus used in accordance with the principles of the invention.

FIG. 1 depicts a high-level block diagram of an exemplary packet stream processing apparatus used in accordance with the principles of the invention. Specifically, the packet stream processing apparatus of FIG. 1 comprises a stream identification sequence function 110, a network packet converter 120, and a network interface/link 130.

The stream identifier (ID) and sequence function 110 receives an initial packet stream, such as a Moving Pictures Experts Group (MPEG) MPEG-2 transport stream, elementary stream(s), a data stream comprising a file to be transmitted or any other data stream. The initial packet stream is processed to produce a resulting packet stream PACKETS, which is coupled to the network packet converter 120. The resulting packet stream PACKETS may comprise those packets forming the initial packet stream without modification. Additionally, the stream ID and sequence function 110 produces a stream identifier and sequence code that are also coupled to the network packet converter 120.

Each packet (or a group of packets) from the initial packet stream is associated with a stream identifier and a sequence code. The stream identifier identifies the initial packet stream to which the packet belongs. The sequence code identifies the relative or absolute position within that packet stream such that a plurality of initial packet stream packets received via different transmission channels may be consolidated into a coherent packet stream by a receiver.

The network packet converter 120 operates to encapsulate or associate each of one or more packets received (or packet groups) from the stream ID and sequence function 110 in a respective payload portion of a network packet structure. Additionally, the stream ID and sequence code associated with the one or more packets to be encapsulated is also included within the network packet structure. In the case of the initial packet stream having a format compatible with the network packet structure, the network packet converter 120 operates to associate each packet within the initial packet stream with a stream identification number and sequence code. Where the initial packet stream packet structure is compatible with a transport network packet structure, the network packet converter 120 operates to associate the stream ID and sequence code into the initial packet stream packet structure.

In one embodiment of the invention, the header portion of the network packet structure is adapted to include a stream identifier field and a sequence code field for storing this information. In another embodiment of the invention, the stream ID and sequence function 110 inserts stream ID and sequence data into the header portions of the initial packets to be transported.

The network packet converter 120 produces a network packet stream $NPS_1$ that is coupled to the network interface/link 130. The network interface/link 130 receives a plurality of network packet streams $NPS_1$, $NPS_2$, $NPS_3$, etc. up to $NPS_X$ (collectively network packet streams NPS). Each of the network packet streams NPS may include packet streams processed using a respective stream ID and sequence function 110 and network packet converter 120. Each of the network packet streams NPS may also comprise packet streams processed in some other manner. In any event, the packet structure utilized in the network packet streams NPS preferably is compatible with the network interface/link 130.

The network interface/link 130 receives the network packet streams NPS and responsively transmits the received network packet streams NPS via one or more transport channels. It is important to note that there does not need to be a one to one correlation between received network packet streams NPS and transmission channels. That is, a single network packet stream NPS may comprise data sufficient to occupy a plurality of transmission channels. Similarly, one transmission channel may have sufficient bandwidth to satisfy the demands of at least portions of a plurality of network packet streams NPS.

Each of the plurality of transmission channels provided by the network interface/link 130 carries a respective channel transport stream T. The channel transport stream T utilizes a packet structure compatible with the network interface/link 130 that is modulated according to the requirements of the transmission medium or network (not shown) used to convey the various transmission channels. Such modulation techniques include, for example, quadrature amplitude modulation (QAM), vestigial side band (VSB) modulation and other modulation techniques well known to those skilled in the art. It is noted that the subject invention may be practiced within the context of a satellite communications link, a terrestrial wireless link, a terrestrial wired or optical link and the like. Within the context of a digital satellite system (DSS) compliant satellite system, quadrature phase shift key (QPSK) modulation techniques are utilized.

In the exemplary embodiment, the network interface/link 130 generates 16 right hand circularly polarized (RHCP) channel transport streams denoted as $T1_R$ through $T16_R$, as well as 16 left hand circularly polarized (LHCP) channel streams denoted as $T1_L$ through $T16_L$. These 32 channels are propagated to a receiver via, for example, a satellite transmission system. Thus, portions of the network interface/link 130 may be realized as space-based portions of a direct broadcast satellite (DBS) system.

In one embodiment of the invention, the network interface/link comprises all functions necessary to receive the network packet streams NPS, uplink the received packet streams to a satellite and transmit from the satellite the above-described right and left hand polarized channels on one transponder. It will be appreciated by those skilled in the art that the network interface/link 130 may cooperate with a plurality of transponders on one or more satellites to transmit a larger or smaller number of transmission streams.

A network packet structure suitable for implementing the present invention will be described in more detail below with respect to FIG. 3. Briefly, the network packet structure 300 of FIG. 3 provides for the inclusion within a payload portion of one or more packets from the initial packet stream. Additionally, within the network packet payload portion or header portion is included information suitable for reforming the sequence of the initial packet stream. Additionally, identification information is provided such that a plurality of initial packet streams may be reformed at one or more receivers.

FIG. 2 depicts a graphical representation of a DBS frequency plan, exemplary of a frequency plan which may be used in accordance with the principles of the invention. Specifically, FIG. 2A depicts the nominal DSS frequency plan for right hand circularly polarized (RHCP) channels, while FIG. 2B depicts the nominal DSS frequency plan for left hand circularly polarized (LHCP) channels. Given a total of, illustratively, 32 channels, the 16 odd channels are RHCP channels and are shown in FIG. 2A, while the 16 even channels are LHCP channels and are shown in FIG. 2B. The odd channels start at a channel center frequency of 974.0 MHz (channel 1) and extend to 1,413.4 MHz (channel 31). Each channel is 24 MHz in width, each center frequency is separated by an adjacent center frequency by 29.16 MHz. Similarly, the even channels start at a channel center frequency of 988.5 MHz (channel 2) and extend to a channel center frequency of 1,425.98 MHz (channel 32). DSS is a trademark of Hughes Electronics. A packet structure suitable for use within the DSS system is described in "DSS Transport Protocol" Version 1.1, Feb. 12, 1996, which protocol is incorporated herein by reference in its entirety.

In one embodiment of the invention, the 32 channels provided by the network interface/link 130 of FIG. 1 substantially conform to the DSS frequency plan of FIG. 2. However, it will be appreciated by those skilled in the art that the present invention may be practiced with any frequency plan and any number of channels. It is noted that the subject invention finds particular utility within the context of two or more transmission channels due to the ability to split or distribute an initial packet stream among the two or more transmission channels.

FIG. 3 depicts an exemplary data structure used in accordance with the principles of the invention. Specifically, the data structure 300 comprises a packet structure having a header portion 310 and a payload portion 320.

The header portion 310 comprises standard header data 311, stream identifier data 312, and a sequence code 314.

The payload portion 320 is used to carry one or more packets from, for example, an initial packet stream. By associating each of the one or more initial packets of the payload portion with a stream identifier and sequence code, a receiver may rearrange packets received from a plurality of transport channels to produce the initial packet stream for subsequent processing. In this manner, an initial packet stream may be transported using a plurality of transport channels and reformed at a receiver for subsequent processing. In the case of a plurality of packets being included within a payload portion of a network packet data structure, the plurality of packets or a group of packets are arranged in a known sequence such that a single sequence code may represent the point within an initial bit stream that the entire group of packets should be inserted.

Optionally, in one embodiment, the header portion 310 is further augmented by other data 316. As will be discussed in more detail below, the other data 316 may comprise channel identifier data and time of transmission data. The channel identifier data is used to identify which transmission or transport channel(s) will be used to transport the stream identified in field 312. The time of transmission data is used to indicate the actual time of such transmission(s). In this manner, where a receiver is capable of processing a smaller number of transport channels, a "channel hopping" mechanism is implemented whereby one or more of the channel processors at the receiver select the identified channel(s) at the identified time(s) to retrieve therefrom the stream identified in field 312.

The data structure 300 comprises, illustratively, a data packet structure suitable for transport via the transport channels $T1_R$ through $T16_R$ (or $T1_L$ through $T16_L$) of the system 100 of FIG. 1. It is noted that the data packet structure 300 of FIG. 3 may be modified by those skilled in the art to conform to the packet structure appropriate to any network or transmission medium having multiple channels.

In the apparatus 100 of FIG. 1, each transport channel T transmits a sequence of packets at a predefined (typically maximum) data rate. When data is available to be transmitted, the data is inserted into the payload portion of the network transport packets and transmitted. When data is not available, NULL transport packets are normally transmitted. According to an embodiment of the invention, the NULL transport packets are replaced by transport packets including data, the data used to replace the NULL data may comprise non-real-time data or other data that may be held by the transmitter until such time as a NULL packet is available for replacement. In this case, due to the "bursty" nature of the appearance of NULL packets or use of NULL packets within the transmission system, the data to be transmitted in place of the NULL packets is preferably not real-time or streaming data such as video, audio and the like. A particularly useful form of data to be transmitted in this manner is program guide data and other bulk file data.

In one embodiment of the invention, a movie or other content is inserted into one or more output streams received by a set top terminal such that the movie or other content may be stored in a mass storage device associated with the set top terminal. In this embodiment, the movie or other content is transmitted to the set top terminal in non-real-time. That is, a movie or other content may be transmitted to the set top terminal as bandwidth allows and over a period of time, such as overnight. In this manner, excess bandwidth may be utilized to retrieve content from a server for subsequent presentation by a set top terminal.

In one embodiment of the invention, the stream identifier data and sequence code is augmented by a channel identifier field and a transmission time identifier field. The channel identifier field indicates the transport channel(s) that will provide desired data (i.e., data associated with the data stream identified by the stream identifier). The transmission time identifier field indicates the time that such data will be provided by the identified transport channel(s). In this embodiment, where a transport channel becomes unable to transmit data at a desired rate, the data to be transmitted is provided to the receiver via an alternate transport channel(s). Prior to changing the transport channel(s) used to transport the data, the channel identifier field and time identifier field in the data transmitter via the original transport channel is populated with information enabling the receiver to determine which new transport channel will be used, and when data will be available on the new transport channel. It is noted that data may be made available on multiple transport channels at multiple times and that the channel identifier and time identifier data may also be provided on multiple transport channels. In this manner, a receiver processing any of the transport channels may determine which other transport channels will include desired data.

In addition to the regular overhead that is carried by the choice of encoding and/or modulation within the communications system, the following information may also be included as other data: (1) the number of transponders employed within the communications system and the identification of those transponders used to carry desired data; (2) the timing of the use of the employed transponders, including information relevant to changing between different transponders for contiguous data or related data streams; (3) the order of the data transmitted and any redundancy of such data, along with a map or other means for facilitating the recombination of such data; and (4) default display information.

A receiver adapted to reconstruct an initial packet stream processed according to the present invention is disclosed in simultaneously filed U.S. patent application Ser. No. 09/942,810 which is incorporated herein by reference in its entirety. The disclosed receiver simultaneously receives each of a plurality of transport channel streams T (e.g., each of the 16 RHCP or 16 LHCP channels in the DSS frequency plan). The simultaneously received plurality of streams are then processed to extract packets or packet groups included within the network packet structures. The stream identification and sequence codes associated with the extracted initial packet streams are used to reconstruct the initial packet streams. The reconstructed packets or packet groups are then subjected to further processing, such as video decoding, audio decoding, data processing or other processing functions.

Figure 4:
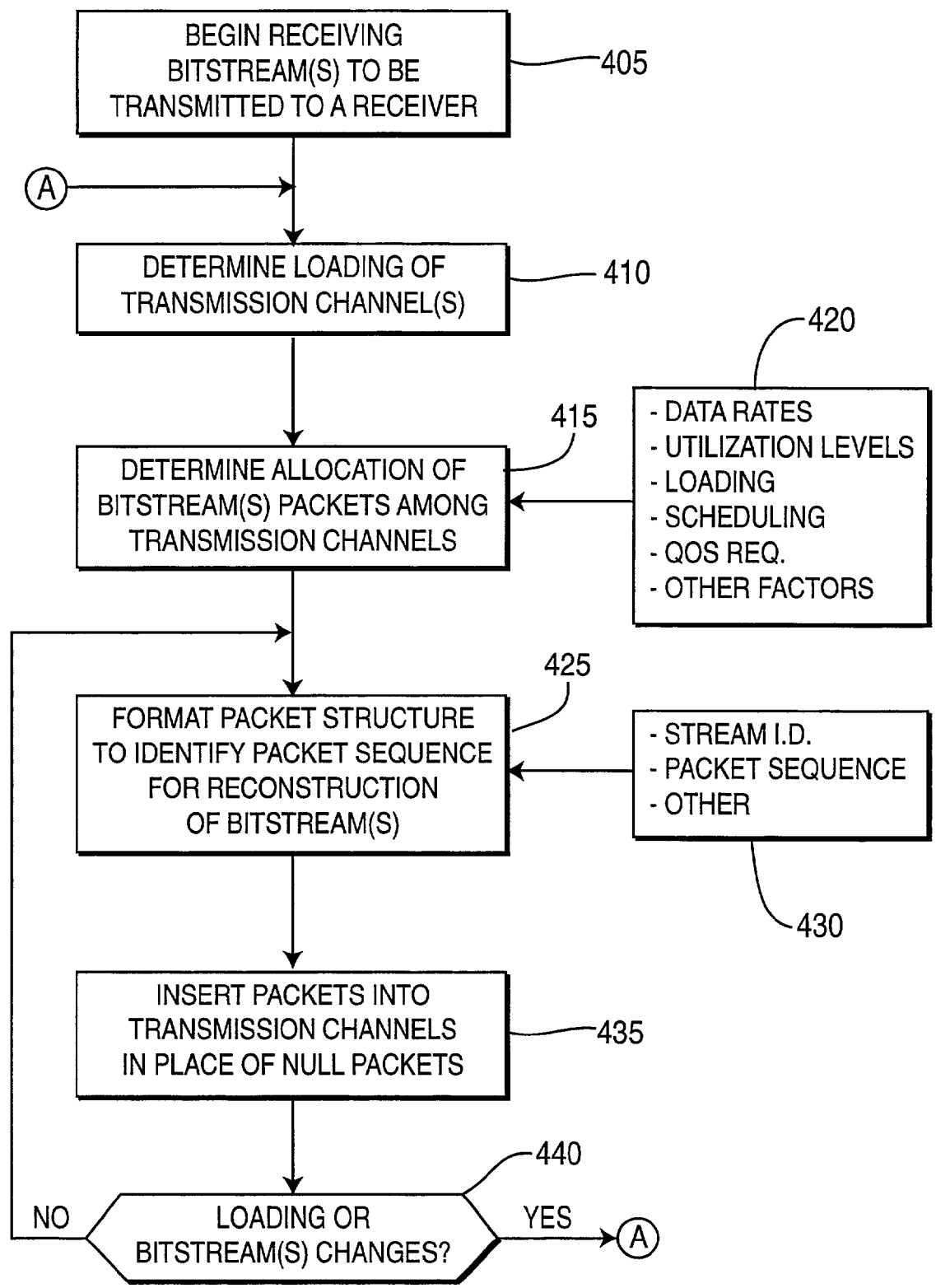
FIG. 4 depicts a flow diagram of an exemplary method used in accordance with the principles of the invention.

FIG. 4 depicts a flow diagram of an exemplary method used in accordance with the principles of the invention. Specifically, the method 400 of FIG. 4 depicts various processing steps used to incorporate the data of one or more bit streams into a packet data structure adapted to a multiple channel transmission network. Each packet, or related group of packets, is associated with a stream identification and packet sequence information to assist in the stream reconstruction process at a receiver. Based upon transmission channel loading and other factors, the initial bit stream packets are transmitted via one or more transmission channels to the receiver. The transmitted packet streams may comprise primary packet streams to be transmitted via a particular channel transport stream, or secondary packet streams to be opportunistically inserted in place of NULL packets nominally utilized in one or more channel transport streams. In any event, the initial bit stream packets so processed are reconstructed by a receiver using the stream ID and sequence code information associated with the packets prior to transmission.

At step 405 one or more bitstreams to be transmitted begin to be received by the network interface/link 130. At step 410, a determination is made as to the loading of the various transmission channels. That is, at step 410 the network interface/link determines the available channel capacity that may be utilized to transport bitstreams being received.

At step 415, an allocation of bitstream(s) packets is determined with respect to the available transmission channels. That is, referring to box 420, the data rates, utilization levels, loading, scheduling, quality of service (QOS) requirements and other factors associated with the channels used for transmission and the data to be transmitted are evaluated to determine how the data to be transmitted should be allocated among the available transmission channels such that the data will be handled in an appropriate manner which utilizes available bandwidth to the extent possible. In the channel hopping embodiment, packets are also allocated according to identified channels and channel transmission times. In this case, where it is impossible or impractical to transmit the data so allocated to the identified channel (or at the identified transmission time), channel identification and/or transmission time information may be adapted to cause transmission via another channel, at the same time or at (preferably) a later time.

At step 425, the packet structure to identify packet sequence for reconstruction of the bitstream(s) is formatted. That is, referring to box 430, the stream ID and packet sequence code associated with each packet or sequential/contiguous group of packets within a particular bitstream to be transmitted is determined, and the packets are encapsulated in the network packet structure (if necessary) along with such information for transmission. In addition, other data may be inserted into encapsulating packet structure or otherwise associated with the data to be transmitted. As previously discussed, the other information may include channel identification information and associated transmission time information. Such channel identification and transmission time information find applicability within the previously discussed "channel hopping" transmission methodologies and other system configurations.

At step 435, the packets to be transmitted are inserted in place of, illustratively, NULL packets within the transmission channels identified as having underutilized bandwidth. Optionally, those packets associated with respective channel identification and transmission time information are transmitted on the identified channel at the identified transmission time (or as near to the identified transmission time as practicable).

At step 440, a determination is made as to whether any changes have been made to transmission channel loading or the bitstream(s) being transmitted. If no changes are noted, then the method 400 proceeds to step 425. If changes are noted, then the method 400 proceeds to step 410.

The above-described method processes one or more initial packet streams and opportunistically inserts those one or more initial packet streams and corresponding stream identification and packet sequence data into transport channels T. The method also adapts the insertion in response to changes in the utilization levels of the various transport channels. Since each of the initial packets or packet groups may be reconstructed by a corresponding receiver, it is only necessary that the processed initial packets be included within a transport channel actually received by the receiver. Thus, in the exemplary embodiment, where all 16 of the right hand or all 16 of the left hand circularly polarized channels are received by a receiver, it is only necessary to insure that the initial packet stream intended for processing by that receiver be inserted into one or more of the appropriate 16 channels received by that receiver.

Figure 5:
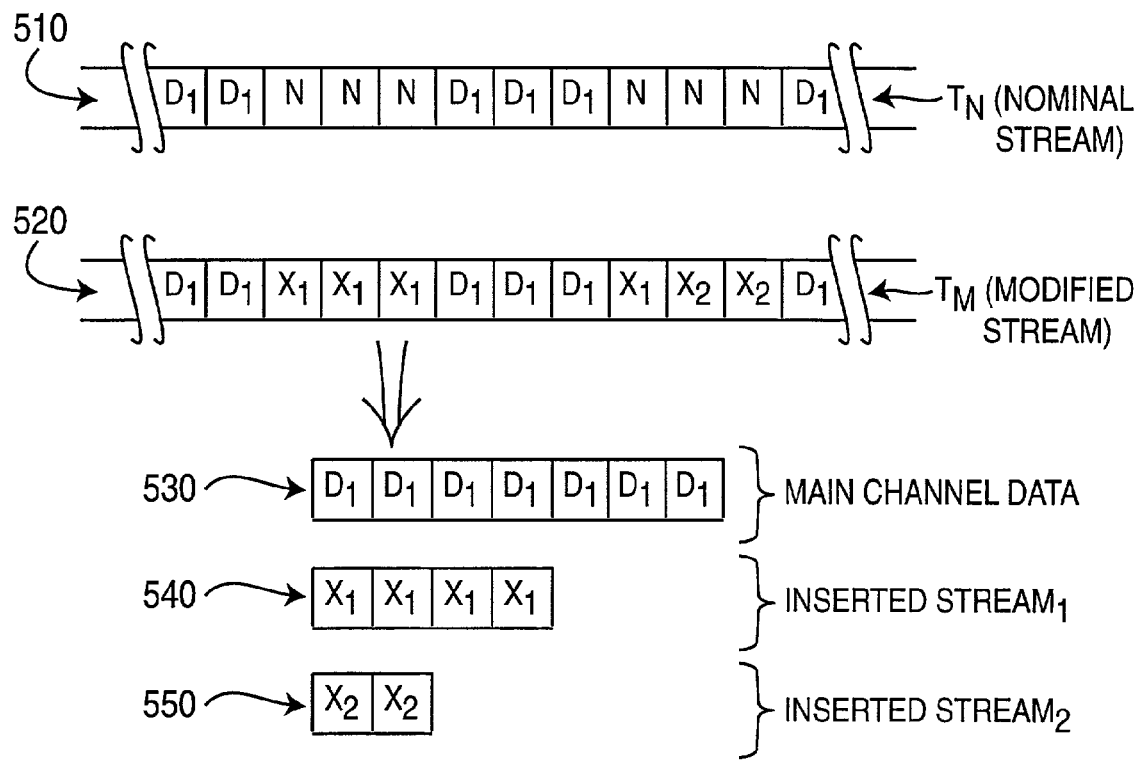
FIG. 5 depicts a graphical representation of exemplary packet stream processing as performed in accordance with the principles of the invention.

FIG. 5 depicts a graphical representation of exemplary packet stream processing as performed in accordance with the principles of the invention. Specifically, a nominal transmission channel packet stream 510 is shown comprising a plurality of data packets $D_1$ interspersed with NULL packets N. After processing in accordance with the principles of the present invention, the NULL packets N in the nominal transport stream 510 are replaced with packets from a plurality of inserted streams. Specifically, a modified stream 520 is shown comprising the initial data packets $D_1$ interspersed with inserted data packets $X_1$ and $X_2$ from the respective bitstreams. In this manner, upon transmitting the modified stream 520, no bandwidth is wasted by transmitting NULL packets.

At a receiver, the main channel data packets D1 are retrieved as data stream 530, the first inserted stream packets $X_1$ are retrieved as data stream 540 and the second inserted stream packets $X_2$ are retrieved as data stream 550. It is noted that each of the packets X inserted into the stream conform to the packet structure discussed above with respect to FIGS. 1 through 4.

Figure 6:
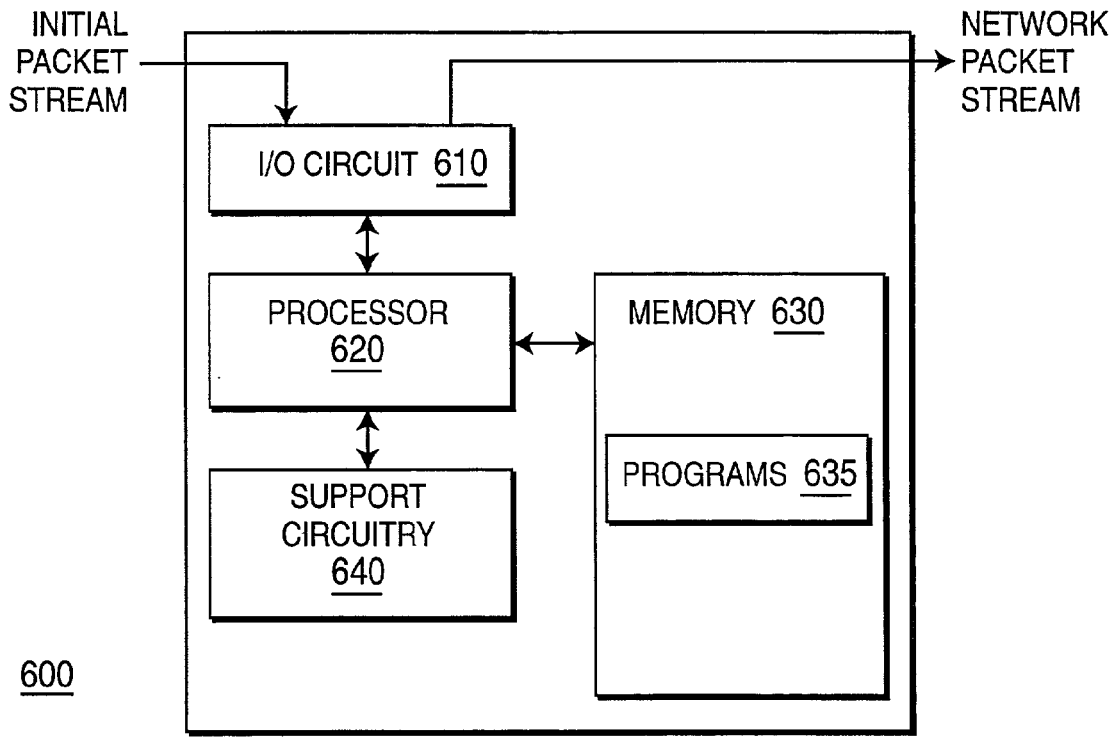
FIG. 6 depicts a high-level block diagram of an exemplary processor suitable for use in the apparatus of FIG. 1, and in accordance with the principles of the present invention.

FIG. 6 depicts a high-level block diagram of an exemplary processor suitable for use in the apparatus of FIG. 1, and in accordance with the principles of the present invention. Specifically, the processor 600 of FIG. 6 may be adapted to implement the stream ID and sequence function 110, the network packet converter function 120 or both functions together. Additionally, the processor 600 of FIG. 6 may be used to implement logical processing portions of the network interface/link 130. The processor 600 comprises microprocessor 620 as well as memory 630 for storing various programs 635. The microprocessor 620 cooperates with conventional support circuitry 640, such as power supplies, clock circuits, cache memory and the like, as well as circuits that assist in executing the software routines stored in the memory 630. As such, it is contemplated that some of the process steps discussed herein as software processes may be implemented within hardware, for example, as circuitry that cooperates with the microprocessor 620 to perform various steps. The processor 600 also contains input/output (I/O) circuitry 610 that forms an interface between the functional elements implemented by the processor 600 and adjacent functional elements within the apparatus 100 of FIG. 1. Although the processor 600 of FIG. 6 is depicted as a general purpose computer that is programmed to perform various processing functions in accordance with the present invention, the invention can be implemented in hardware as, for example, an application specific integrated circuit (ASIC). As such, the process steps described herein are intended to be broadly interpreted as being equivalently performed by software, hardware, or a combination thereof.

In one embodiment, the processor 600 is used to implement both the stream ID and sequence function 110 and the network packet converter function 120. In this embodiment of the invention, the processor 600 receives an initial packet stream and responsively produces a network packet stream in accordance with the packet structure discussed above with respect to FIGS. 1–4.

In another embodiment, the processor 600 implements logical portions of the network interface/link 130. That is, the processor 600 is used to implement the methodology for determining which network packet stream or network packet streams should be included in a particular transmission channel. In this embodiment, the programs 635 include algorithms that receive information pertaining to the bandwidth utilization of the respective transmission channels, information as to the bandwidth requirements of data to be transmitted, and information pertaining to data to be opportunistically inserted into the transmitted channel streams. Thus, given a nominal bandwidth allocation algorithm that typically provides NULL packet transmission for portions of the transmission channel time slices, the nominal algorithm is modified according to the present invention to instead insert opportunistic data in place of the NULL packets, as discussed above with respect to FIGS. 1–4.

Although various embodiments, which incorporate the teachings of the present invention, have been shown and described in detail herein, those skilled in the art can readily devise many other varied embodiments that still incorporate these teachings.

What is claimed is:

1. A method comprising:

associating each of at least one group of packets forming a bitstream with a stream identifier and a respective sequence code, said at least one group of packets comprising at least one bitstream packet;

transmitting, via any one of a plurality of available transmission channels, each of said at least one group of packets, said transmission channels nominally transmitting NULL packets in the event of underutilization, said at least one group of packets being transmitted in place of said nominally transmitted NULL packets to minimize the underutilization of said transmission channels; and adapting a packet structure for at least one packet of said at least one group of packets to conform to a network packet structure suitable for use by said transmission channels, wherein said network packet structure includes transmission channel and time of transmission information for identifying a particular one or more of the plurality of available transmission channels and a corresponding one or more times for one or more subsequent transmissions that include any remaining packets forming the bitstream to allow a corresponding receiver to expect the remaining packets on the identified particular one or more of the plurality of available transmission channels at the corresponding one or more times.

2. The method of claim 1, wherein:

said network packet structure comprises a header portion and a payload portion, said payload portion including at least one associated groups of packets.

3. The method of claim 2, wherein:

said network packet structure includes stream identifier and sequence code information corresponding to said at least one group of packets included within said payload portion.

4. The method of claim 1, wherein said step of transmitting comprises:

determining a loading of each of a plurality transmission channels;

determining an allocation of bitstream packets among the transmission channels; and inserting non-allocated bitstream packets into said transmission channels in place of said nominally transmitted NULL packets.

5. The method of claim 4, wherein said allocation of bitstream packets among said transmission channels is determined with respect to at least one of the following criteria:

transmission channel data rates, bitstream data rate, transmission channel utilization level, transmission channel loading level, transmission channel scheduling, bitstream quality of service requirement.

6. Apparatus, comprising:

a bitstream processor, for associating each of at least one group of packets forming a bitstream with a stream identifier and a respective sequence code; and a network interface, for causing said associated at least one group of packets to be inserted into any one of a plurality of available transmission channels in place of NULL packets nominally transmitted in the event of transmission channel underutilization to minimize the underutilization of said transmission channels, wherein a packet structure associated with ones of said at least one group of packets is adapted to conform to a network packet structure suitable for use by ones of said plurality of available transmission channels, wherein said network packet structure includes transmission channel and time of transmission information for identifying a particular one or more of the plurality of available transmission channels and a corresponding one or more times for one or more subsequent transmissions that include any remaining packets forming the bitstream to allow a corresponding receiver to expect the remaining packets on the identified particular one or more of the plurality of available transmission channels at the corresponding one or more times.

7. The apparatus of claim 6, wherein said network interface utilizes said channel identification and time of transmission information to allocate respective transmission channel time slots to the remaining packets.

8. A data structure adapted for transport of data via a communications network, said data structure comprising a header portion and a payload portion, said payload portion including at least one packet from an initial bitstream, said at least one packet having associated with it a stream identifier and a sequence code, said stream identifier identifying said initial bitstream, said sequence code identifying a relative position within said initial bitstream of said at least one packet, wherein said data structure associated with said at least one packet is adapted to conform to a network packet structure suitable for use on at least one of a plurality of available transmission channels, and wherein said at least one packet associated with said data structure is used to replace at least one NULL packet nominally transmitted in the event of transmission channel underutilization to minimize the underutilization of said transmission channels, wherein said network packet structure includes transmission channel and time of transmission information for identifying a particular one or more of the plurality of available transmission channels and a corresponding one or more times for one or more subsequent transmissions that include any remaining packets forming the bitstream to allow a corresponding receiver to expect the remaining packets on the identified particular one or more of the plurality of available transmission channels at the corresponding one or more times.

9. The data structure of claim 8, wherein said stream identifier and said sequence code are stored within said header portion of said data structure.

10. The data structure of claim 8, wherein said stream identifier and said sequence code are stored within the payload portion of said data structure.

11. The data structure of claim 8, wherein said channel identification and time of transmission information are stored within said header portion of said data structure.

12. The data structure of claim 8, wherein said channel identification and time of transmission information are stored within the payload portion of said data structure.

* * * * *